(12) United States Patent
Poertner et al.

(10) Patent No.: US 8,342,614 B2
(45) Date of Patent: Jan. 1, 2013

(54) COMPOSITE RIM FOR A BICYCLE WHEEL

(75) Inventors: Joshua Poertner, Carmel, IN (US); Michael Hall, Carmel, IN (US); David Morse, Indianapolis, IN (US)

(73) Assignee: SRAM, LLC, Chicago, IL (US)

(*) Notice: Subject to any disclaimer, the term of this patent is extended or adjusted under 35 U.S.C. 154(b) by 300 days.

(21) Appl. No.: 12/775,474

(22) Filed: May 7, 2010

(65) Prior Publication Data
US 2011/0273001 A1 Nov. 10, 2011

(51) Int. Cl.
*B60B 21/00* (2006.01)
(52) U.S. Cl. .......... 301/95.107; 301/95.102; 301/95.103
(58) Field of Classification Search .................. 301/55, 301/58, 61, 95.101, 95.102, 95.103, 95.104, 301/95.107, 95.108
See application file for complete search history.

(56) References Cited

U.S. PATENT DOCUMENTS

| | | | | |
|---|---|---|---|---|
| 6,347,839 B1 * | 2/2002 | Lew et al. | ................ | 301/95.102 |
| 7,258,402 B2 * | 8/2007 | Meggiolan | ............... | 301/95.103 |
| 7,331,639 B2 * | 2/2008 | Okajima | ......................... | 301/58 |
| 7,350,877 B1 * | 4/2008 | Muraoka et al. | ................ | 301/58 |
| 7,377,595 B1 * | 5/2008 | Okajima et al. | ................ | 301/58 |
| 7,464,994 B2 * | 12/2008 | Okajima et al. | ................ | 301/58 |
| 7,578,563 B2 * | 8/2009 | Muraoka et al. | ................ | 301/58 |
| 7,614,706 B2 * | 11/2009 | Meggiolan et al. | ...... | 301/95.102 |
| 7,934,778 B2 * | 5/2011 | Denk et al. | ............... | 301/95.103 |
| 8,066,336 B2 * | 11/2011 | Passarotto | ....................... | 301/58 |
| 2008/0265657 A1 | 10/2008 | Reuteler | | |
| 2009/0058180 A1 | 3/2009 | Poertner et al. | | |
| 2010/0090518 A1 * | 4/2010 | Schiers | ......................... | 301/55 |

FOREIGN PATENT DOCUMENTS

DE 102007026782 A1 9/2008

* cited by examiner

*Primary Examiner* — Kip T Kotter
(74) *Attorney, Agent, or Firm* — Milan Milosevic; Lisa Serdynski; Steven Courtright

(57) ABSTRACT

A composite rim for a bicycle wheel generally includes a radially outer tire-engaging portion, a radially inner spoke-engaging portion and first and second sidewalls. The second sidewall is spaced apart from the first sidewall. The first and second sidewalls extend between the tire engaging and spoke-engaging portions. The rim includes at least one through-hole and a pattern of through-thickness stitching reinforcement at the through-hole. The tire-engaging and spoke-engaging portions and first and second sidewalls form a toroid.

15 Claims, 10 Drawing Sheets

COMPOSITE RIM FOR A BICYCLE WHEEL

BACKGROUND OF THE INVENTION

This present invention relates to bicycle composite rims, and more particularly, to a bicycle composite rim having a three-dimensional reinforced hole and the method of manufacturing the composite bicycle rim.

A composite rim is made up of a plurality of fibrous sheets or plies that are cured within a bed of epoxy or resin. The fibers within the bed of epoxy or resin may be oriented in the X or Y directions and made of carbon, ceramic, glass or the like. Although fibers are very strong in their direction of orientation, they are less strong in their cross or perpendicular directions. Due to the anisotropic nature of fiber-reinforced composite sheets, the sheets oriented in the X-Y directions are reinforced by the fibers themselves, which can create and support load paths running along their length. However, in the sheet Z-direction, or out-of-plane direction, the fibers are only reinforced by the resin binding the sheets together. Further, the resin works best when it only has to transmit shear forces between sheets.

Problems arise in the area of through-holes on the rim because compression forces are concentrated at severed fiber ends at the through-hole edges, creating large tensile and shear forces in the resin itself. Ultimately, the high forces cause the resin to shear apart between the laminates, a failure mode known as interlaminar shear or delamination. This creates near infinite stress risers or concentrations at the crack edge between the plies of reinforcing fiber. Any subsequent loading causes the cracks to propagate very quickly. Ultimately, the sheet laminate loses its ability to withstand the compression loading and the laminate around the perimeter of the through-holes buckles. Accordingly, there is a need to provide a rim having 3-dimensional reinforced through-holes.

SUMMARY OF THE INVENTION

The present invention provides a composite rim for a bicycle wheel generally including a radially outer tire-engaging portion, a radially inner spoke-engaging portion, a first sidewall, a second sidewall spaced apart from the first sidewall. The first and second sidewalls extend between the tire engaging and spoke-engaging portions. The rim includes at least one through-hole and a pattern of through-thickness stitching reinforcement at the through-hole. The tire-engaging and spoke-engaging portions and first and second sidewalls form a toroid.

In one embodiment of the present invention, the at least one through-hole includes a plurality of spoke through-holes spaced circumferentially along a line at the radially inner spoke-engaging portion. The pattern of through-thickness stitching reinforcement extends along the line of plurality of through-holes. The pattern of through-thickness stitching reinforcement includes a plurality of stitching rows, one of the plurality of stitching rows intersecting the line of through-holes, another of the plurality of stitching rows extending proximate the line of through-holes. The pattern of through-thickness stitching reinforcement may also include a cover-stitch pattern interlacing the plurality of stitching rows on interior and exterior surfaces of the spoke-engaging portion. The composite rim is made of a plurality of prepreg fibrous sheets. The pattern of through-thickness stitching reinforcement is, formed with a thread.

In another embodiment of the present invention, the pattern of through-thickness stitching reinforcement includes a perimeter stitching pattern of the through-hole. The perimeter stitching pattern interlaces a radial stitching along the interior and exterior surfaces of the spoke-engaging portion and along an edge of the through-hole.

In one embodiment of the present invention, the composite bicycle rim is made by layering the plurality of precut fibrous sheets, the sheets including the spoke-engaging portion. The sheets are precut to be formed into the desired final rim shape. The sheets are sown together with the pattern of through-thickness stitching reinforcement along the line at the spoke-engaging portion. The sheets are draped into tooling to form the toroid. The toroid may be formed into any closed-curve shape. The toroid is cured under heat and pressure in an autoclave. The plurality of through-holes is punched through laminate sheets along the line of the pattern of through-thickness stitching reinforcements. The plurality of precut fibrous sheets may be partially cured before sewing together the sheets with the pattern of through-thickness stitching reinforcements along the spoke-engaging portion.

In another embodiment of the present invention, the composite rim is made by layering the plurality of precut fibrous sheets, the sheets including the spoke-engaging portion. The sheets are precut to be formed into the desired final rim shape. The plurality of through-holes is punched through the precut fibrous sheets along a line at the spoke-engaging portion. The sheets are sown together with the pattern of through-thickness stitching reinforcement at the perimeters of the through-holes. Mandrels are inserted into the through-holes. The plurality of precut fibrous sheets is draped into tooling to form the toroid. The toroid is cured under heat and pressure in an autoclave.

These and other features and advantages of the present invention will be more fully understood from the following description of one or more embodiments of the invention, taken together with the accompanying drawings.

DETAILED DESCRIPTION

Figure 1:
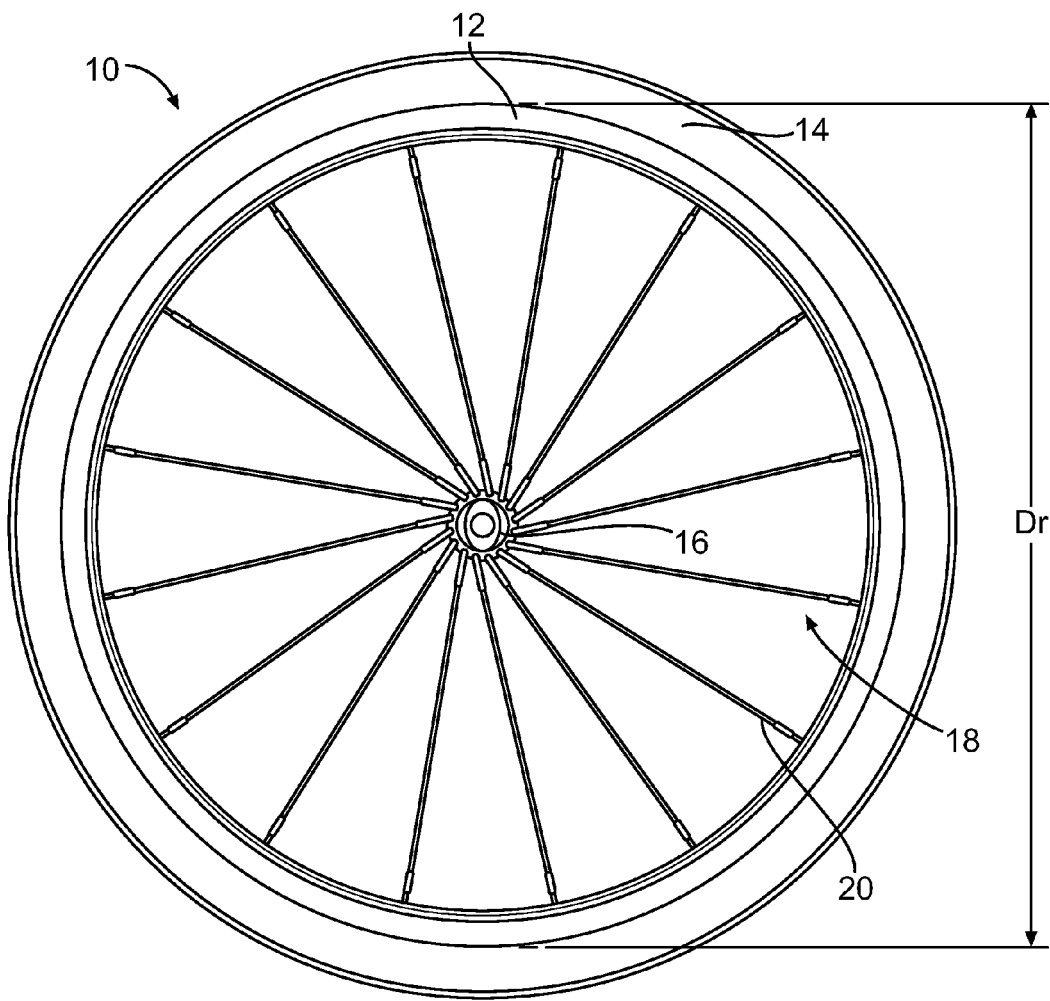
FIG. 1 is a side view of bicycle wheel.
Figure 2:
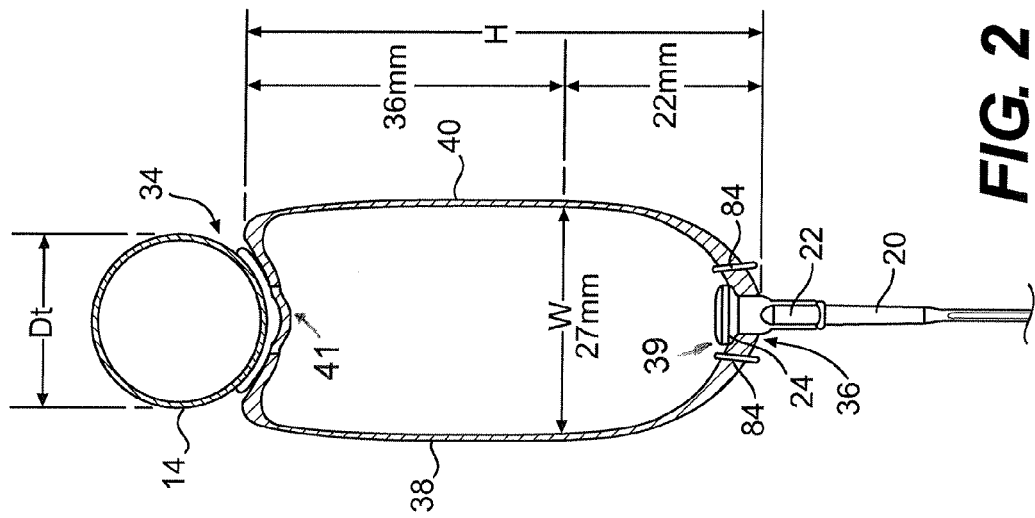
FIG. 2 is a cross-sectional view of the bicycle wheel of FIG. 1.

FIGS. 1 and 2 illustrate a bicycle wheel 10 including a toroidal rim 12, a tire 14, a hub 16 and a spoke system 18. The hub 16 is mounted to a frame of the bicycle (not shown). The spoke system 18 includes a plurality of metal spokes 20, typically about thirty-two to thirty-six spokes. Looking to FIG. 2, the spoke 20 includes a threaded end 22 and a nipple 24 to secure the spoke 20 to the rim 12.

The wheel 10 shown in FIGS. 1 and 2 is a tubular or sew-up type wherein the tire 14 is glued to the rim 12. The rim 12 generally includes a radially outer tire-engaging portion 34, a radially inner spoke-engaging portion 36, a first sidewall 38 and a second sidewall 40 spaced apart from the first sidewall 38. The first and second sidewalls 38, 40 extend between the tire-engaging 34 and spoke-engaging portion 36. The tire 14 is glued to the tire-engaging portion 34 of the rim 12. The spoke-engaging portion 36 includes a plurality of first openings or through-holes 39 for receiving the threaded ends 22 of the spokes 20 therethrough. The tire-engaging portion 34 includes a plurality of second openings 41 aligned with the plurality of first openings 39 for receiving a tool to tighten the nipples 24 on the threaded ends 22 of the spokes 20 to secure the spokes 20 to the rim 12. The tire-engaging and spoke-engaging portions 34, 36 and first and second sidewalls 38, 40 form a toroid.

Figure 3:
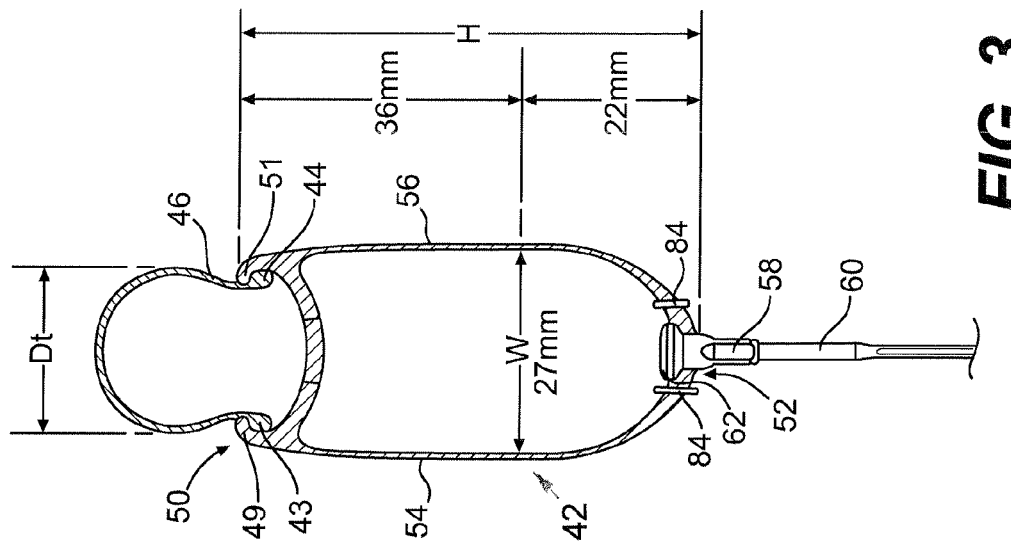
FIG. 3 is a cross-sectional view of a bicycle wheel.

Another type of wheel is shown in FIG. 3, a clincher wheel 42, wherein beads 43, 44 of a tire 46 are clinched onto a rim 48. The rim 48 generally includes a radially outer tire-engaging portion 50, a radially inner spoke-engaging portion 52, a first sidewall 54 and a second sidewall 56 spaced apart from the first sidewall 54. The first and second sidewalls 56, 54 extend between the tire-engaging and spoke-engaging portion 50, 52. The tire-engaging portion 50 includes a pair of circumferential bead engaging members 49, 51 for engaging the beads 43, 44 of the tire 46. The spoke-engaging portion 52 includes a plurality of first openings or through-holes 53 for receiving threaded ends 58 of spokes 60 therethrough. The through-holes 53 are spaced circumferentially along a line at the spoke-engaging portion 52. The tire-engaging portion 50 includes a plurality of second openings 55 aligned with the plurality of first openings 53 for receiving a tool to tighten nipples 62 on the threaded ends 58 of the spokes 60 to secure the spokes 60 to the rim 48. The tire-engaging and spoke-engaging portions 50, 52 and first and second sidewalls 54, 56 form a toroid.

Figure 4:
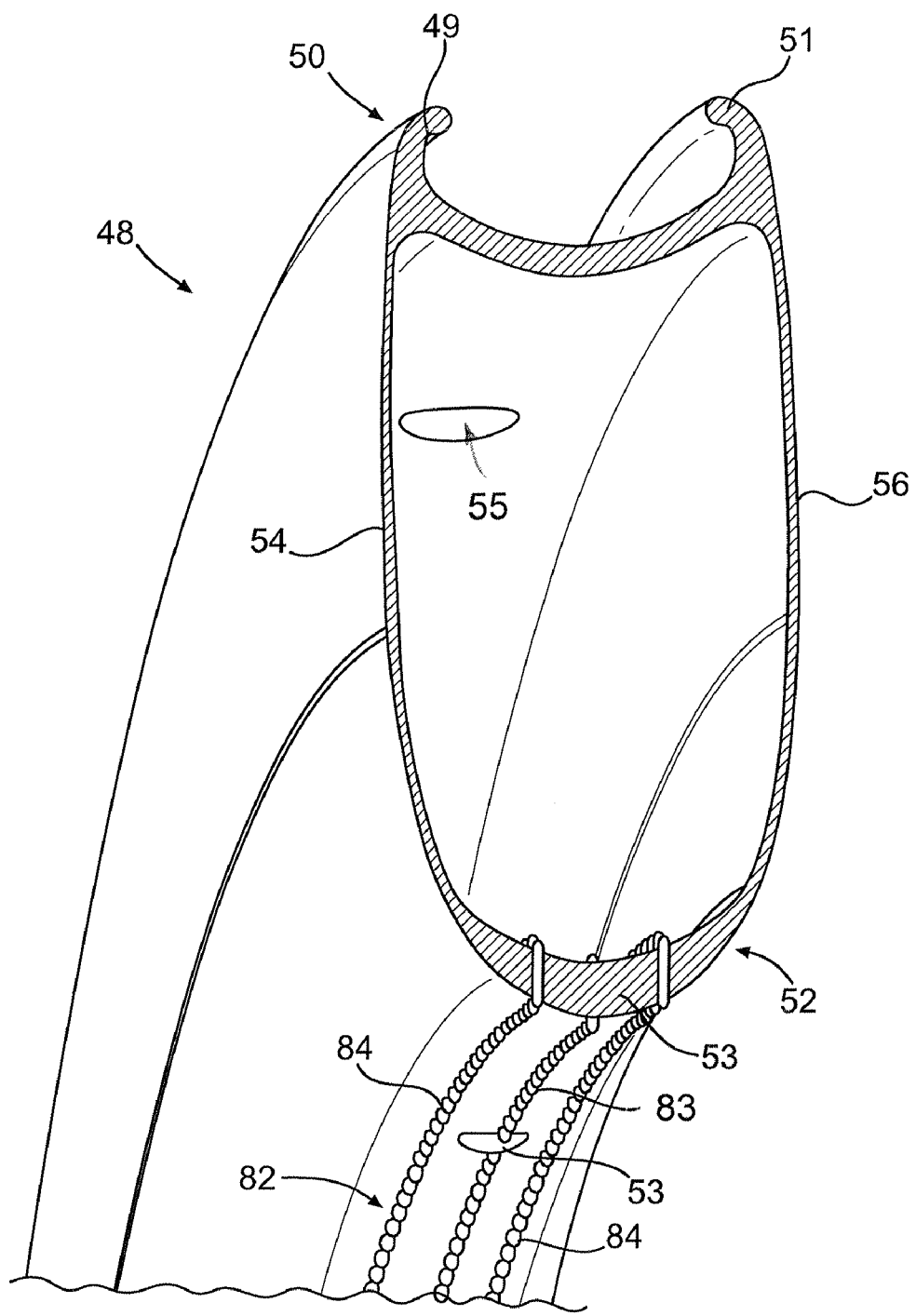
FIG. 4 is a perspective cross-sectional view of a composite rim according to the present invention.

As used herein, toroid or toroidal means a surface generated by a plane closed curve rotated about a line that lies in the same plane as the curve but does not intersect it. The plane closed curve of the toroid may take on any shape. Looking to FIG. 4, the plane closed curve which generates the form of the toroidal rim 12 is substantially an ellipse which has been modified to provide a concave end at the tire-engaging portion 34. Looking to FIGS. 2 and 3, the major and minor cross-sectional dimensions of the toroidal rims 12, 48 define an aspect ratio. The aspect ratios of the rims 12, 48 are the ratio of the rim heights H to the rim widths W. The rim height is defined as the maximum vertical rim dimension when the rim is oriented perpendicular to a horizontal plane. The rim width is the maximum horizontal dimension when the rim is oriented perpendicular to a horizontal plane. Preferably, the toroidal rim 12 and tire 14 mounted thereto form a substantially elliptical cross section and the rim has an aspect ratio ranging from 1.5 to 5. In the embodiments shown, the rims 12, 48 have a maximum height of 58 mm and a maximum width of 27 mm, thus forming an aspect ratio of 2.15. Preferably, the rim height is greater than 40 mm or greater than 7% of the rim diameter Dr. To improve the aerodynamic efficiency, the ratio of the maximum rim width W to the tire diameter Dt is in the range of approximately of 1.05 to 1.25. The maximum width W of the toroidal rims 12, 48 is disposed closer to the spoke-engaging portions 36, 52 than the tire-engaging portions 34, 50. In FIGS. 2 and 3, the maximum width W is disposed 22 mm from the end of the rim. Typically, the toroidal rims are made entirely of a composite material. Further, the interior of the rims may be solid, hollow, filled or reinforced as desired to obtain the desired strength, weight and cost.

Figure 5:
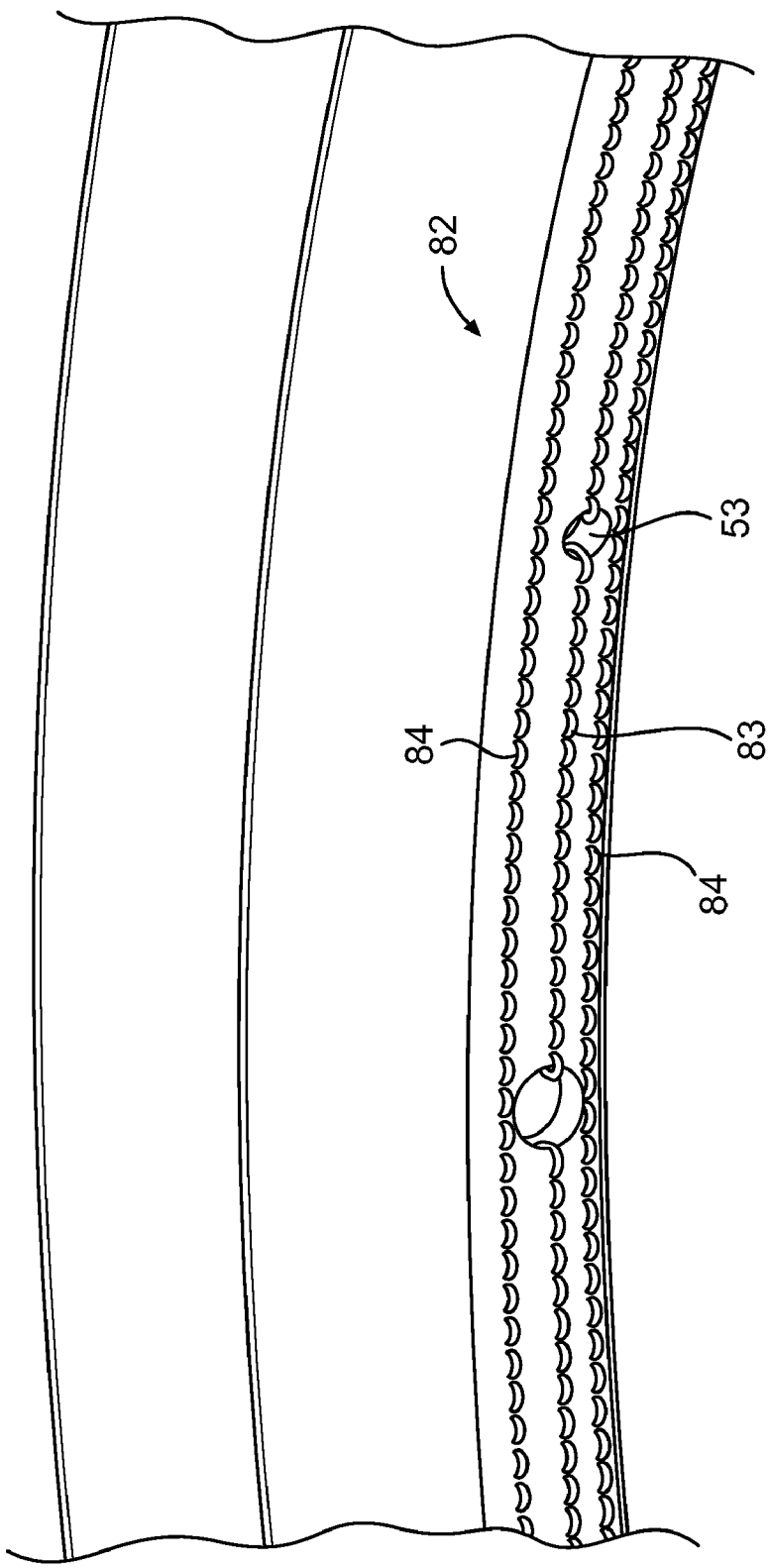
FIG. 5 is a perspective radially inner view of a portion of the composite rim of FIG. 1.
Figure 6:
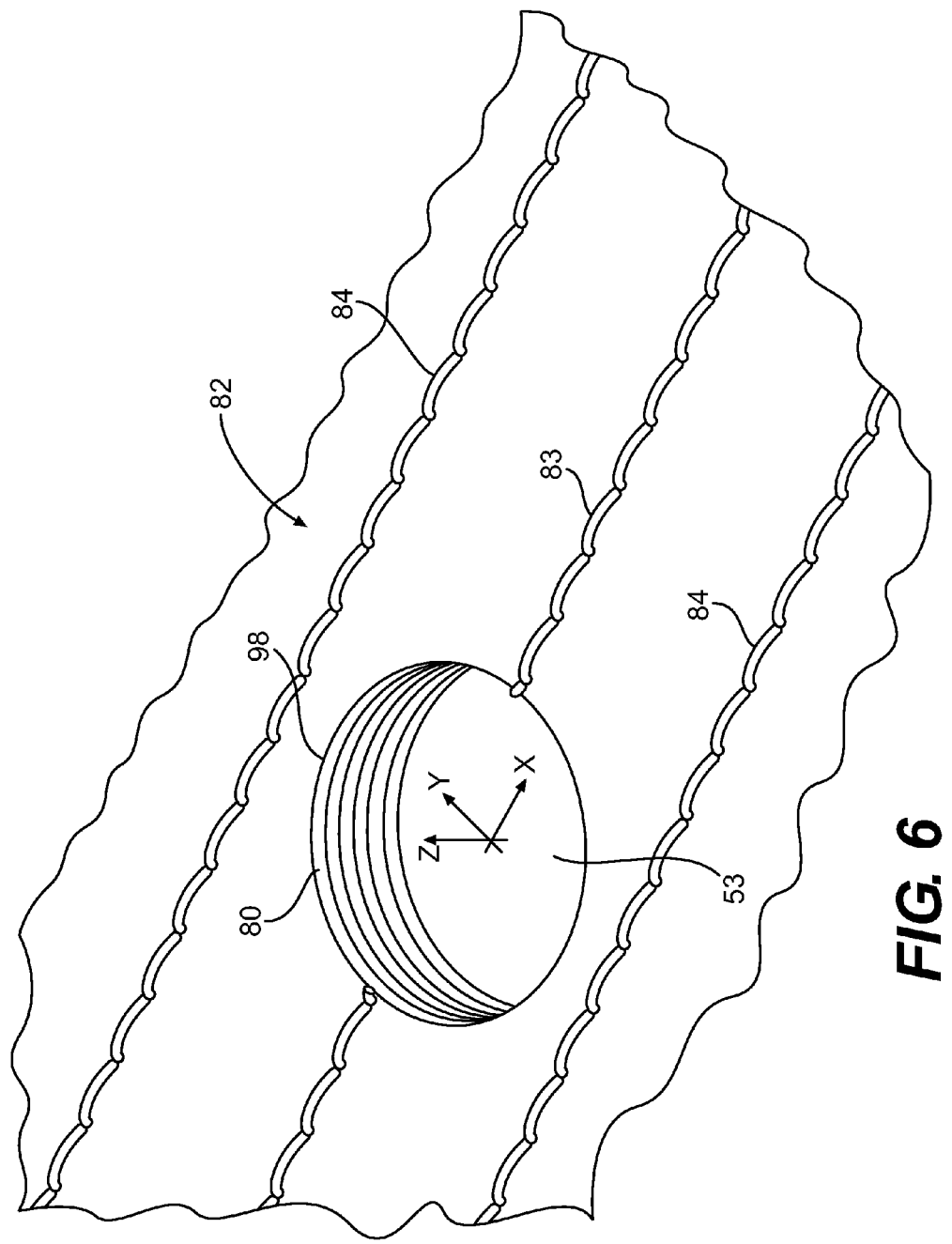
FIG. 6 is a detail perspective view of a through-hole of the composite rim of FIG. 1.

Looking to FIG. 6, the composite rim 48 is made of a plurality of fibrous sheets 80. The sheets 80 include fibers that are placed within a matrix of epoxy or resin, thus forming pre-impregnated or "prepreg" sheets. The fibers within the matrix are oriented in a particular direction providing high strength in their direction of orientation (for example X-direction, FIG. 6) and less strength in directions perpendicular (for example, Y and Z directions, FIG. 6) to their direction of orientation. Looking to FIG. 4-6, one embodiment of the rim 48 is shown including a pattern of through-thickness stitching reinforcement 82 for spoke through-holes 53. The stitching reinforcement 82 includes a plurality of stitching rows 83, 84, the center row 83 intersecting the through-hole 53, the parallel adjoining rows 84 extending proximate the line of through-holes 53, on either side of the holes 53.

Figure 7:
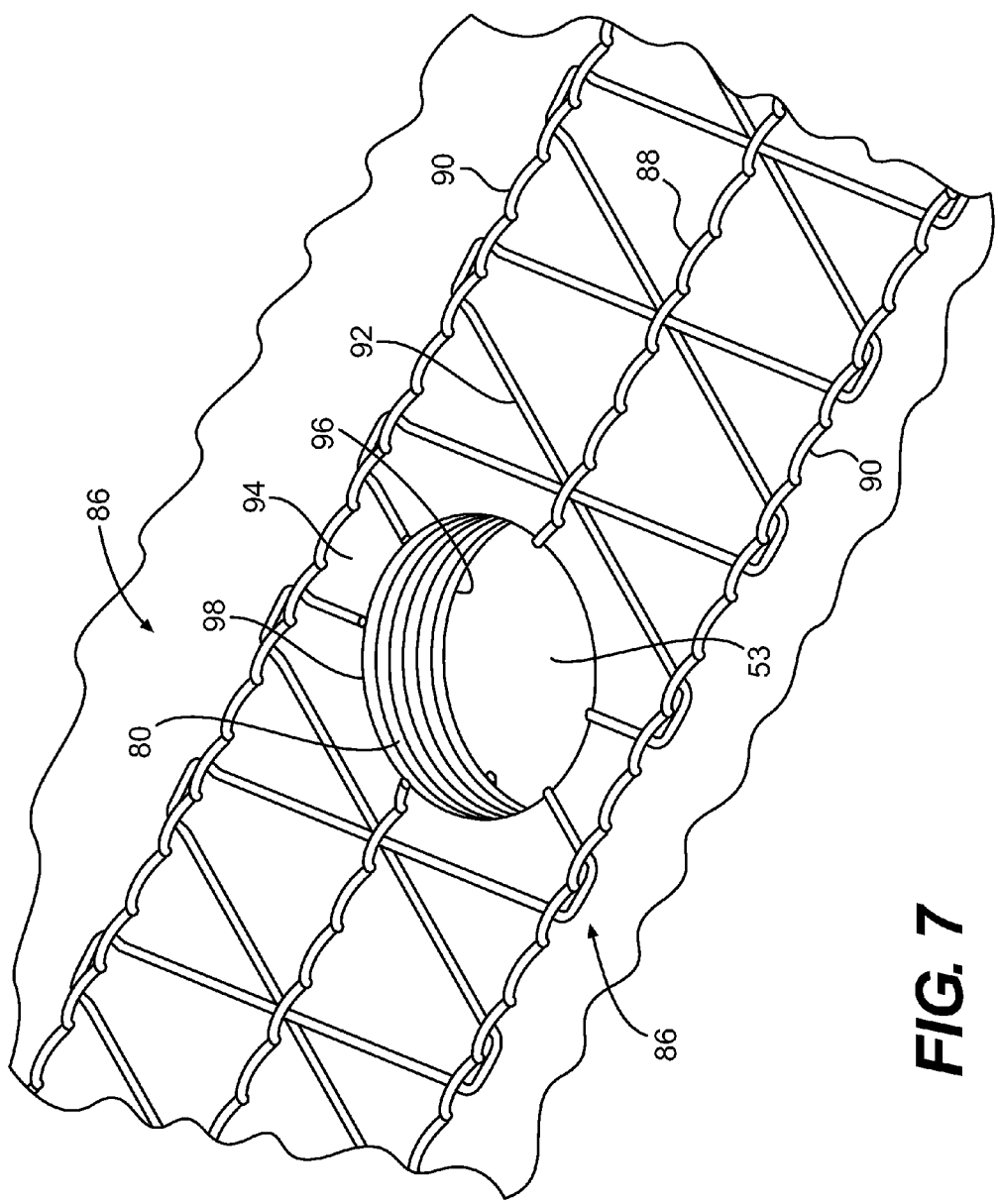
FIG. 7 is a detail perspective view of a through-hole of a composite rim according to another embodiment.
Figure 8:
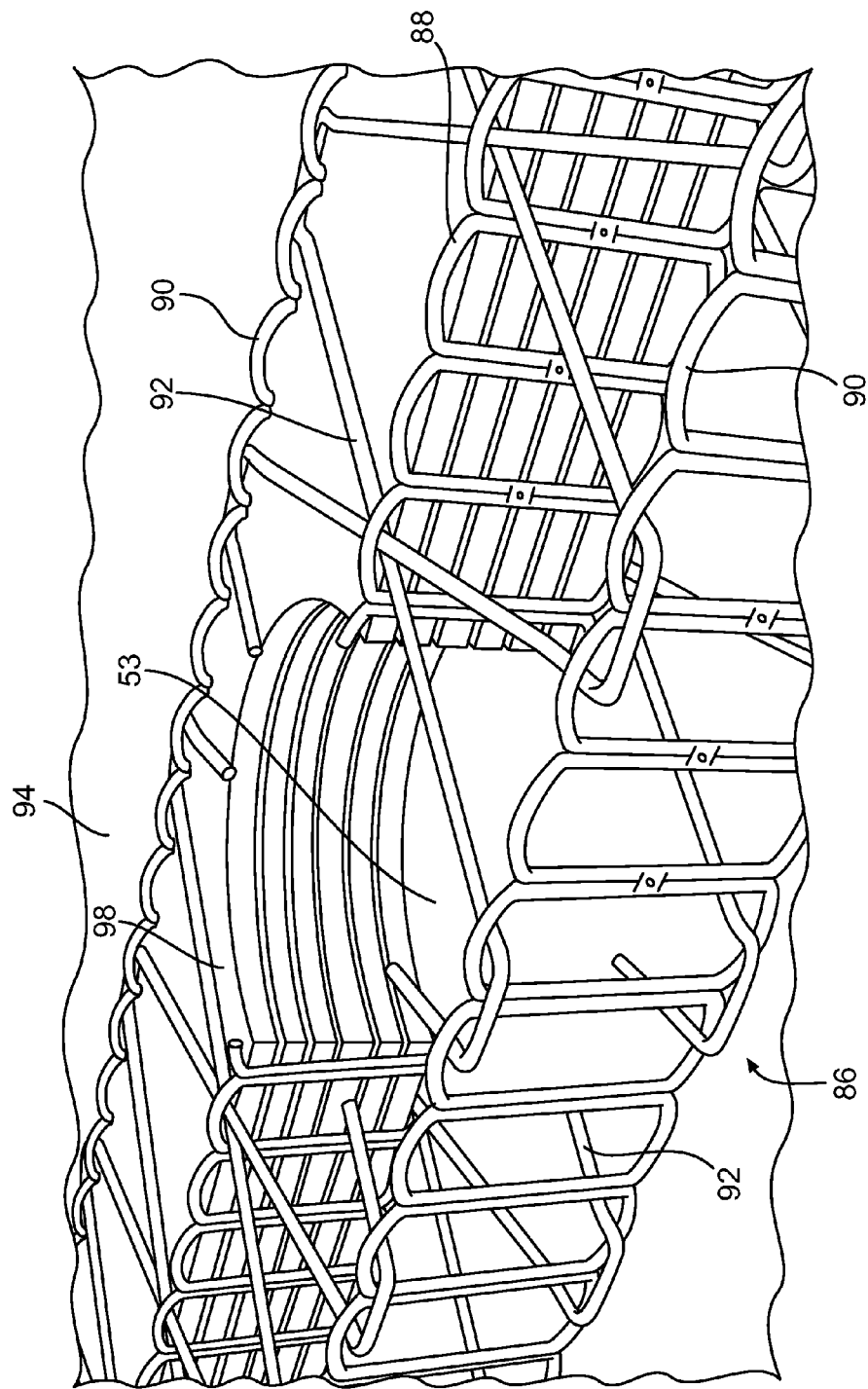
FIG. 8 is a partial cross-sectional perspective view of the composite rim of FIG. 7.

Looking to FIGS. 7 and 8, an alternative pattern of through-thickness stitching reinforcement 86 is shown. The pattern of through-thickness stitching reinforcement 86 includes a plurality of stitching rows 88, 90, the center row 88 intersecting the through-hole 53, the parallel adjoining rows 90 extending proximate the line of through-holes 53, on either side of the holes 53, similar to the pattern of through-thickness stitching reinforcement 82 but includes an additional coverstitch pattern 92. The coverstitch pattern 92 interlaces the plurality of stitching rows 88, 90 on interior and exterior surfaces 94, 96 of the spoke-engaging portion 52. The pattern of through-thickness stitching reinforcement 86 may be formed using 3-needle and 5-thread coverstitch to reinforce the through-holes 53 in the X, Y and Z directions, in particular, the stitching in the Z-direction services to clamp or close edges 98 of through-holes 53 to inhibit interlaminar shear and fiber delamination. The various thread materials can be used including Kevlar®.

Figure 9:
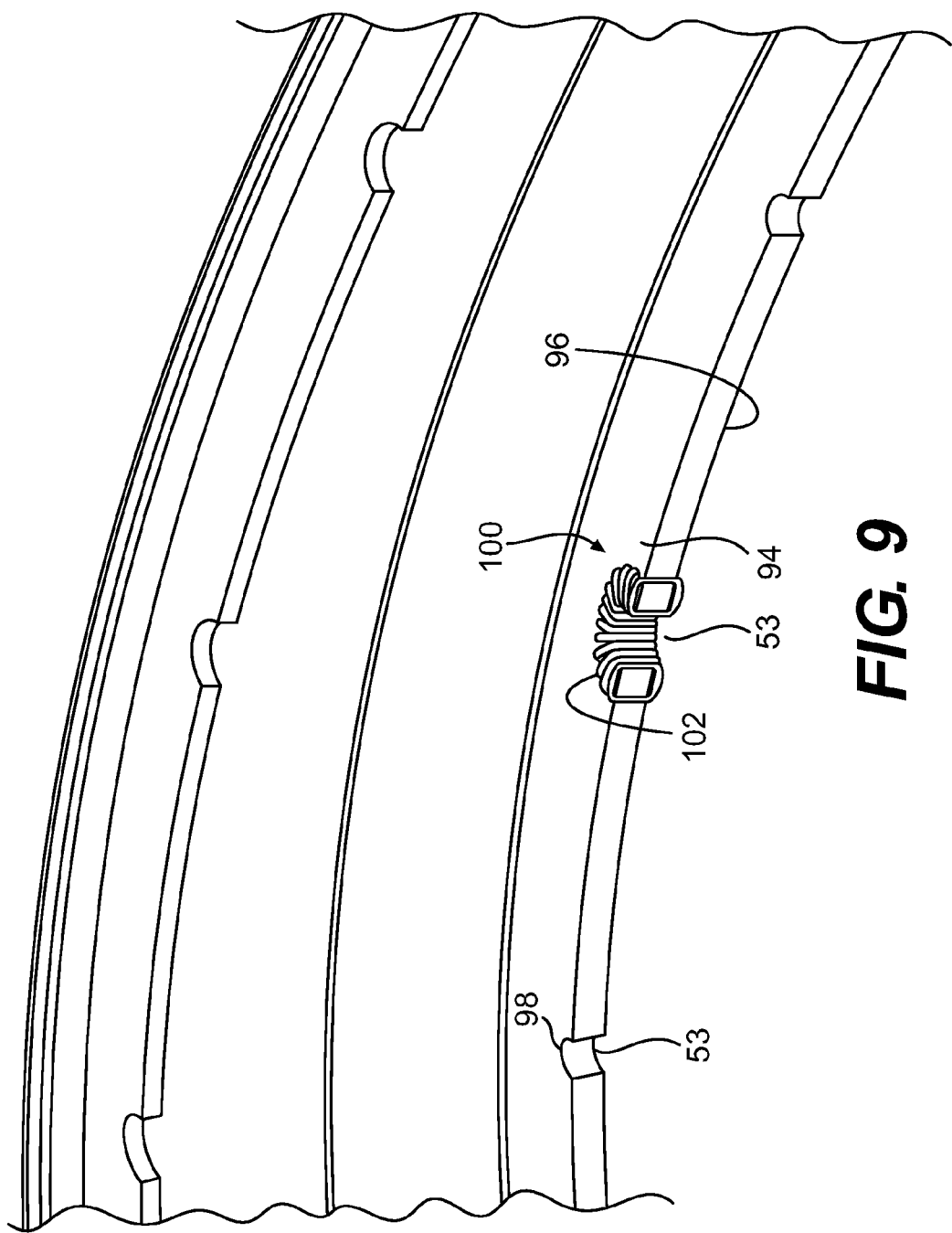
FIG. 9 is a partial cross-sectional view of a composite rim according to another embodiment.
Figure 10:
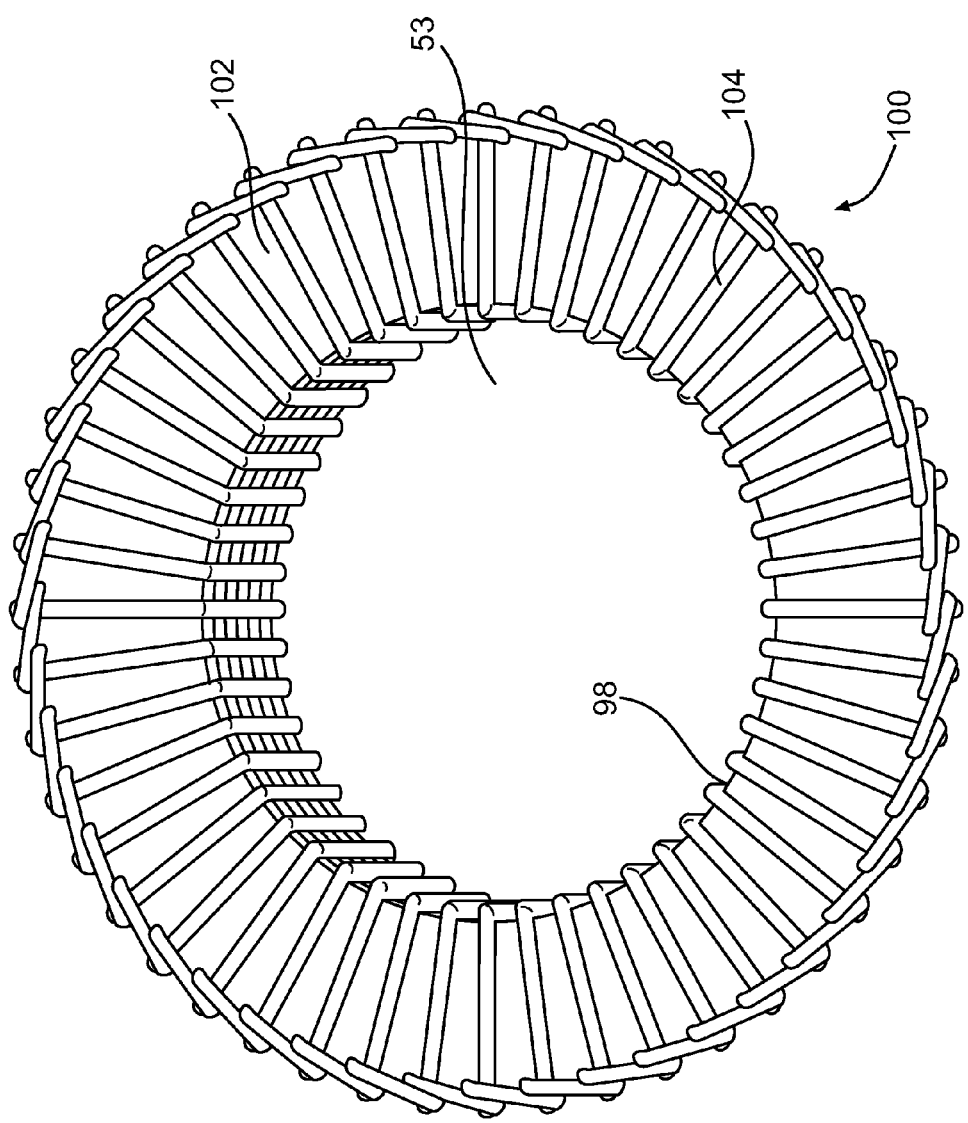
FIG. 10 is a detail perspective view of a through-hole of FIG. 9.
Figure 11:
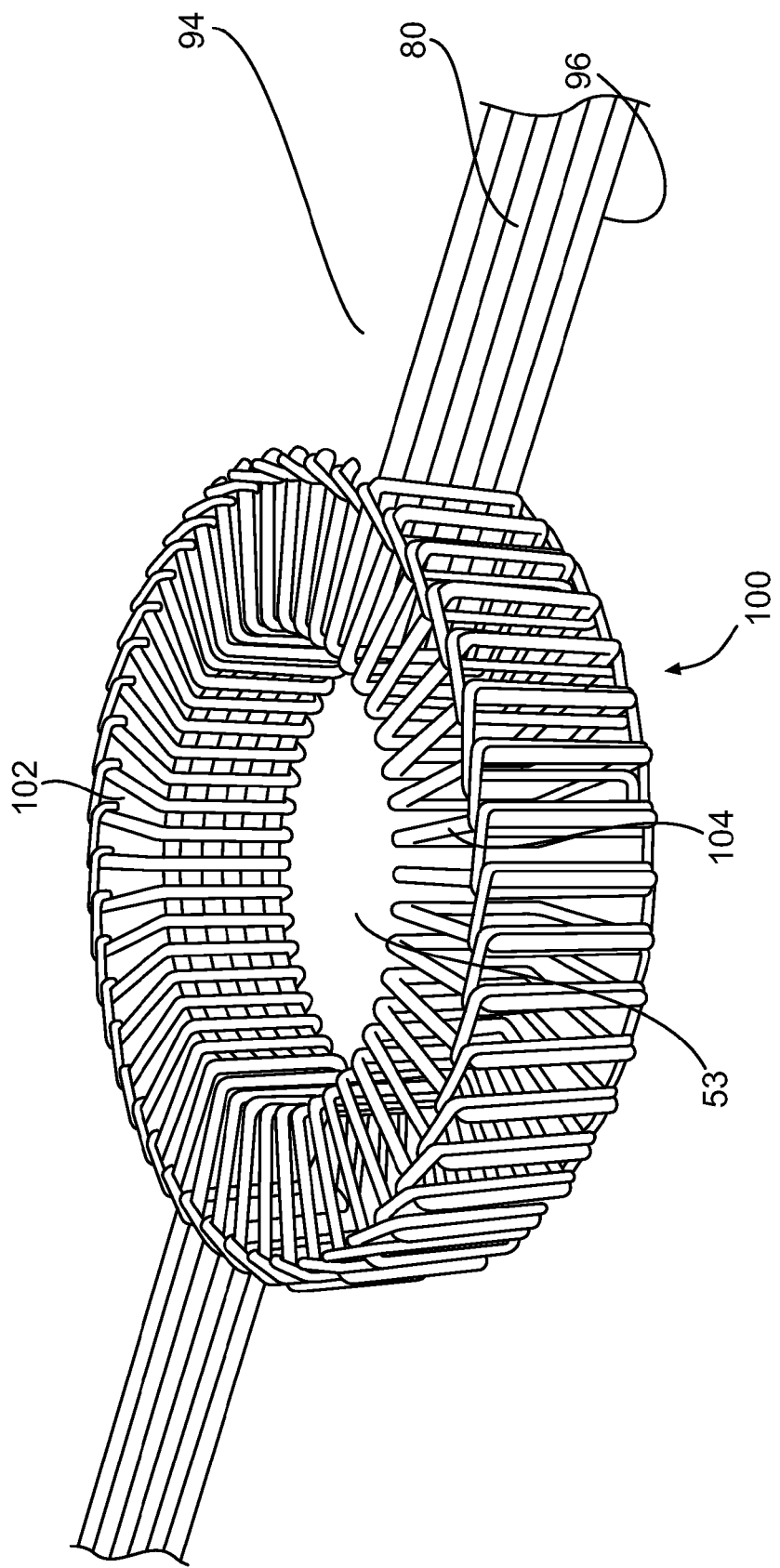
FIG. 11 is a partial cross-sectional perspective view of the composite rim of FIG. 9.

Looking to FIGS. 9-11, an alternative pattern of through-thickness stitching reinforcement 100 is shown for a perimeter 102 of the through-hole 53. The pattern of through-thickness stitching reinforcement 100 includes interlacing radial stitching 104 along the interior and exterior surfaces 94, 96 of the spoke-engaging portion 52 and along the edge 98 of the through-hole 53.

The composite bicycle rim 48 is made by layering the plurality of precut fibrous sheets 80, the sheets 80 including the spoke-engaging portion 52. The sheets 80 are precut to be formed into the desired final rim shape. The sheets 80 are sown together with pattern of through-thickness stitching reinforcement 82 or 86 along the line at the spoke-engaging portion 52. The sheets 80 are draped into tooling to form the toroid. The toroid may be formed into any closed-curve shapes. The toroid is cured under heat and pressure in an autoclave. The plurality of through-holes 53 are punched through laminate sheets along the line of pattern of through-thickness stitching reinforcements 82 or 86. The plurality of precut fibrous sheets 80 may be partially cured before sewing together the sheets 80 with pattern of through-thickness stitching reinforcements 82 or 86 along the spoke-engaging portion.

Alternatively, the composite rim 48 is made by layering the plurality of precut fibrous sheets 80, the sheets 80 including the spoke-engaging portion 52. The sheets 80 are precut to be formed into the desired final rim shape. The plurality of through-holes 53 are punched through the precut fibrous sheets 80 along a line at the spoke-engaging portion 52. The sheets 80 are sown together with the pattern of through-thickness stitching reinforcement 100 at the perimeters 102 of the through-holes 53. Mandrels (not shown) are inserted into the through-holes 53. The plurality of precut fibrous sheets 80 is draped into tooling to form the toroid. The toroid is cured under heat and pressure in an autoclave.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A composite rim for a bicycle wheel comprising:
    a radially outer tire-engaging portion;
    a radially inner spoke-engaging portion;
    a first sidewall;
    a second sidewall spaced apart from the first sidewall, the first and second sidewalls extending between the tire engaging and spoke-engaging portions; and
    at least one through-hole; and
    a pattern of through-thickness stitching reinforcement intersecting the through-hole,
    the tire-engaging and spoke-engaging portions and first and second sidewalls forming a toroid.

2. The composite rim of claim 1 wherein the at least one through-hole includes a plurality of through-holes spaced circumferentially along a line at the radially inner spoke-engaging portion, the pattern of through-thickness stitching reinforcement extending along the line of plurality of through-holes.

3. The composite rim of claim 2 wherein the plurality of through-holes are spoke holes.

4. The composite rim of claim 3 wherein the pattern of through-thickness stitching reinforcement includes a plurality of stitching rows, one of the plurality of stitching rows intersecting the line of through-holes, another of the plurality of stitching rows extending proximate the line of through-holes.

5. The composite rim of claim 4 wherein the radially inner spoke-engaging portion includes an interior surface and an exterior surface, the pattern of through-thickness stitching reinforcement includes a coverstitch pattern interlacing the plurality of stitching rows on the interior and exterior surfaces.

6. The composite rim of claim 5 wherein the composite rim is made of a plurality of prepreg fibrous sheets.

7. The composite rim of claim 6 wherein the pattern of through-thickness stitching reinforcement is formed with a thread.

8. The composite of claim 1 wherein the composite rim is made of a plurality of prepreg fibrous sheets.

9. The composite rim of claim 8 wherein the pattern of through-thickness stitching reinforcement is formed with a thread.

10. A composite rim for a bicycle wheel comprising:
    a radially outer tire-engaging portion;
    a radially inner spoke-engaging portion;
    a first sidewall;
    a second sidewall spaced apart from the first sidewall, the first and second sidewalls extending between the tire engaging and spoke-engaging portions; and
    at least one through-hole; and
    a pattern of through-thickness stitching reinforcement at the through-hole,
    the tire-engaging and spoke-engaging portions and first and second sidewalls forming a toroid wherein the through-hole has a perimeter and the pattern of through-thickness stitching reinforcement includes a perimeter stitching pattern of the through-hole.

11. The composite rim of claim 10 wherein the radially inner spoke-engaging portion includes an interior surface and an exterior surface, the through-hole having an edge, the perimeter stitching pattern interlacing a radial stitching along the interior and exterior surfaces and along the edge of the through-hole.

12. The composite rim of claim 11 wherein the at least one through-hole includes a plurality of through-holes spaced circumferentially along a line at the radially inner spoke-engaging portion.

13. The composite rim of claim 12 wherein the plurality of through-holes are spoke holes.

14. The composite rim of claim 13 wherein the composite rim is made of a plurality of prepreg fibrous sheets.

15. The composite rim of claim 14 wherein the pattern of through-thickness stitching reinforcement is formed with a thread.

* * * * *